(12) United States Patent
Funaki et al.

(10) Patent No.: US 6,258,907 B1
(45) Date of Patent: Jul. 10, 2001

(54) PROCESS FOR PRODUCING FLUOROPOLYMER

(75) Inventors: Atsushi Funaki; Teruo Takakura, both of Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/269,166

(22) PCT Filed: Jul. 23, 1998

(86) PCT No.: PCT/JP98/03294

§ 371 Date: Mar. 23, 1999

§ 102(e) Date: Mar. 23, 1999

(87) PCT Pub. No.: WO99/05179

PCT Pub. Date: Feb. 4, 1999

(30) Foreign Application Priority Data

Jul. 24, 1997 (JP) .................................................. 9-198908
Oct. 8, 1997 (JP) .................................................. 9-276184

(51) Int. Cl.$^7$ .................................................. C08F 116/12
(52) U.S. Cl. ...................... 526/247; 526/242; 526/252; 526/253
(58) Field of Search .................................. 526/242, 247, 526/252, 253

(56) References Cited

U.S. PATENT DOCUMENTS

| | | |
|---|---|---|
| 5,182,342 | 1/1993 | Feiring et al. . |
| 5,494,984 | 2/1996 | Funaki et al. . |
| 5,663,251 | 9/1997 | Kato et al. . |

FOREIGN PATENT DOCUMENTS

| | | |
|---|---|---|
| 6-184207 | 7/1994 | (JP) . |
| 7-33807 | 2/1995 | (JP) . |
| 7-90024 | 4/1995 | (JP) . |
| 7-504224 | 5/1995 | (JP) . |

OTHER PUBLICATIONS

M. W. Grenfell, Research Disclosure, No. 405, pp. 80–82, "Hydrofluoroethers as Fluoromoner Reaction Media", Jan. 1998.

Primary Examiner—Helen L. Pezzuto
(74) Attorney, Agent, or Firm—Oblon, Spivak, McClelland, Maier & Neustadt, P.C.

(57) ABSTRACT

A method for producing a fluorine-containing polymer having polymer units based on a fluoroolefin as the main constituting units, wherein a hydrofluoroalkyl ether is used as a polymerization medium.

34 Claims, No Drawings

PROCESS FOR PRODUCING FLUOROPOLYMER

TECHNICAL FIELD

The present invention relates to a method for producing a fluorine-containing polymer. More particularly, it relates to a method for efficiently producing a fluorine-containing polymer having excellent heat resistance, solvent resistance or chemical resistance, by using a polymerization medium which is less likely to bring about environmental destruction.

BACKGROUND ART

In recent years, fluorine-containing polymers are used for various applications, utilizing their characteristics as high polymer materials excellent in heat resistance, solvent resistance, chemical resistance, etc.

As a method of producing a fluorine-containing polymer, a solution polymerization method, a suspension polymerization method or an emulsion polymerization method has been known. As a polymerization medium of the solution polymerization method or the suspension polymerization method, an inert solvent such as a chlorofluorocarbon (CFC) has been commonly used, since a copolymer having a high molecular weight can be obtained or the speed of polymerization is high. As a specific example of CFC, trichlorofluoromethane, dichlorodifluoromethane, trichlorotrifluoroethane or dichlorotetrafluoroethane may be mentioned. Among these, trichlorotrifluoroethane has been mainly used in view of handling.

However, destruction of the ozone layer has been internationally taken up as an environmental problem of global scale, and use of certain CFCs which are considered to be causal substances has been prohibited Therefore, there is substantial demand for developing a substitute for CFC to be used for producing a fluorine-containing polymer.

As a substitute for CFC, a hydrofluorocarbon (HFC) having hydrogen atoms has been proposed, as it has a small ozone destruction coefficient. However, it is known that a substance having C—bonds shows a chain transfer property to a fluoroolefin. Accordingly, it may sometimes be difficult to use it as a polymerization medium for producing a fluoroolefin polymer having a high molecular weight. As another substitute for a polymerization medium, e.g. t-butanol has been known (JPB-52-24073). However, it is necessary to carry out polymerization under high pressure, in order to obtain a copolymer having an adequately high molecular weight.

DISCLOSURE OF THE INVENTION

The present invention provides a method for efficiently producing a fluorine-containing polymer having an excellent heat resistance, solvent resistance or chemical resistance, wherein the speed of polymerization is high, the molecular weight of the fluorine-containing polymer can be made high enough and CFC having a high ozone destruction coefficient is not used.

BEST MODE FOR CARRYING OUT THE INVENTION

The present inventors have conducted extensive studies to solve the above problems and as a result, have found that a (perfluoroalkyl)alkyl ether of the formula 1 (hereinafter referred to as PFAE) has a small chain transfer property, and by using it as a polymerization medium, the object of the present invention can be achieved:

$$R-O-R' \qquad \text{Formula 1}$$

wherein R is a $C_{2-6}$ perfluoroalkyl group and R' is a $C_{1-2}$ alkyl group.

Namely, the present invention provides a method for producing a fluorine-containing polymer by polymerization in a polymerization medium, wherein PFAE represented by the formula 1 is used as the polymerization medium.

The fluorine-containing polymer of the present invention is a polymer having polymer units based on a fluorine-containing monomer having a polymerizable double bond group. The preferred polymer may, for example, be a polymer having polymer units based on a fluoroolefin as the main constituting units, a polymer having polymer units based on a fluorine-containing monomer having at least two polymerizable double bond groups as the main constituting units, or a polymer having polymer units based on a fluorine-containing monomer having an alicyclic structure as the main constituting units.

Further, the fluorine-containing polymer may be a copolymer of the fluorine-containing monomer having at least two polymerizable double bond groups and the fluorine-containing monomer having an alicyclic structure as mentioned above.

The fluorine-containing polymer having polymer units based on a fluoroolefin as the main constituting units is produced by polymerizing a fluoroolefin monomer alone or at least two types thereof, or copolymerizing a fluoroolefin monomer with the following monomer copolymerizable with the fluoroolefin monomer.

The fluoroolefin monomer to be used in the present invention is an olefin having at least one fluorine atom in the molecule, preferably a fluoroolefin monomer having a carbon number of 2 or 3, in view of polymerizability and characteristics of the polymer obtained.

Specific examples of such a fluoroolefin monomer include a fluoroethylene such as $CF_2=CF_2$, $CF_2=CFCl$ and $CF_2=CH_2$, and a fluoropropylene such as $CF_2=CFCF_3$ and $CF_2=CHCF_3$. Such fluoroolefin monomers may be used alone or in combination as a mixture of two or more of them.

The monomer copolymerizable with such a fluoroolefin monomer may, for example, a (perfluoroalkyl) ethylene having a $C_{4-12}$ perfluoroalkyl group such as $F(CF_2)_4CH=CH_2$ or $F(CF_2)_4CF=CH_2$, a perfluorovinylether such as $R^f(OCFXCF_2)_mOCF=CF_2$, wherein $R^f$ is a $C_{1-6}$ perfluoroalkyl group, X is a fluorine atom or a trifluoromethyl group, and m is an integer of from 1 to 6, a vinyl ether having a group which is easily converted to a carboxylic acid group or a sulfunic acid group, such as $CH_3OCOCF_2CF_2CF_2OCF=CF_2$ or $FSO_2CF_2CF_2OCF(CF_3)CF_2OCF=CF_2$, or an olefin monomer such as ethylene, propylene or isobutylene. They may be used alone or in combination as a mixture of two or more of them.

As the fluorine-containing polymer having polymer units based on a fluoroolefin as the main constituting units, a tetrafluoroethylene/ethylene copolymer, a tetrafluoroethylene/perfluoro(alkyl vinyl ether) copolymer, a tetrafluoroethylene/hexafluoropropylene copolymer or a tetrafluoroethylene/hexafluoropropylene/perfluoro(alkyl vinyl ether) copolymer may, for example, be mentioned.

The fluorine-containing polymer having polymer units based on a fluorine-containing monomer having at least two polymerizable double bond groups as the main constituting units, is produced by polymerizing the fluorine-containing monomer alone or copolymerizing it with a fluoroolefin monomer in PFAE.

Specific examples of the fluorine-containing monomer having at least two polymerizable double bond groups include perfluoro(butenyl vinyl ether), perfluoro(allyl vinyl ether) and perfluoro(bisvinyloxymethane). As the fluoroolefin monomer copolymerizable with such a fluorine-containing monomer, $CF_2=CF_2$ or $CF_2=CFCF_3$ is preferred.

The fluorine-containing polymer having polymer units based on a fluorine-containing monomer having an alicyclic structure as the main constituting units, is produced by polymerizing the fluorine-containing monomer alone or copolymerizing it with a fluoroolefin monomer in PFAE.

Specific examples of the fluorine-containing monomer having an alicyclic structure include perfluoro(2,2-dimethyl-1,3-dioxole), 2,2,4-trifluoro-5-trifluoromethoxy-1,3-dioxole and perfluoro(2-methylene-4-methyl-1,3-dioxolan). As the fluoroolefin monomer copolymerizable with such a fluorine-containing monomer, $CF_2=CF_2$ or $CF_2=CFCF_3$ is preferred.

In the present invention, it is necessary to use PFAE as a polymerization medium. If the carbon number of PFAE is too small, the boiling point is too low, and PFAE is in a form of gas at normal temperature, thereby it is inconvenient to handle it when removing the polymerization medium, and if the carbon number is too high, the boiling point is too high, whereby it becomes difficult to separate the polymer and the solvent. Further, as it is necessary to suppress the chain transfer property, it is preferred that PFAE has a small hydrogen content.

Accordingly, R in PFAE is a $C_{2-6}$ perfluoroalkyl group, particularly preferably a $C_{3-4}$ perfluoroalkyl group. R may have a linear structure or a branched structure. R' is a methyl group or an ethyl group. As a specific example of PFAE, $F(CF_2)_4OCH_3$, $F(CF_2)_4OC_2H_5$, $F(CF_2)_3OCH_3$ or $(CF_3)_2CFOCH_3$ may be mentioned.

Further, as PFAE contains hydrogen atoms, the coefficient for warming up the earth is also lower than the perfluoro compound. For example, an estimated value of the life time as an index for the coefficient for warming up the earth, is about 100 years with $C_6F_{14}$, and from 20 to 30 years with $C_6F_{13}H$, whereas it is as small as 4.1 years with $F(CF_2)_4OCH_3$, 1.9 years with $F(CF_2)_3OCH_3$ and 1.2 years with $F(CF_2)_4OC_2H_5$.

In the present invention, a mixed medium of inert solvents such as water and PFAE can be used as a polymerization medium. The amount of the polymerization medium varies depending upon the type of the monomer to be polymerized. However, it is from 3 to 100 times, preferably from 5 to 50 times to the total weight of entire monomers.

In the present invention, as the mode of polymerization, both modes of solution polymerization method and suspension polymerization method can be employed. The polymerization initiator to be used can be suitably selected from ones which are conventionally used, depending upon the mode of polymerization. It may, for example, be an organic peroxide such as bis(chlorofluoroacyl)peroxide, bis(perfluoroacyl) peroxide, bis(ω-hydroperfluoroacyl)peroxide, t-butylperoxyisobutylate or diisopropylperoxydicarbonate, or an azo compound such as azobisisobutyronitrile. The amount of the polymerization initiator can be suitably changed depending upon e.g. the type of polymerization reaction condition. However, it is generally from 0.005 to 5 wt %, particularly from about 0.05 to 0.5 wt %, to the entire monomer to be polymerized.

For the polymerization reaction of the present invention, a wide range of reaction condition can be employed without particular restriction. For example, with regard to the polymerization temperature, an optimum value is selected depending upon e.g. the type of polymerization initiating source. It is, usually from about 0 to about 100° C., particularly from about 30 to about 90° C. The reaction pressure is also suitably selected. It is usually from about 2 to about 100 kg/cm², particularly preferably from about 5 to about 20 kg/cm². In the present invention, polymerization can be advantageously conducted without an excessive reaction pressure. However, it is possible to conduct polymerization under higher pressure, and also under reduced pressure condition. Further, the present invention can be conducted by a suitable operation such as batch operation or continuous system.

With regard to polymerization in the present invention, it is preferred to add a compound having chain transfer property, in order to control the molecular weight of the polymer, and the compound is required to be soluble in PFAE. However, with regard to a compound having a large constant of chain transfer property, only a small amount of it has to be dissolved in PFAE, considering the easiness of adjusting the molecular weight. Further, it is preferred that the compound has a small ozone destruction coefficiency. A compound which meets such requirements may, for example, be a hydrocarbon such as hexane, HFC such as $CF_2H_2$, a hydrochlorofluorocarbon(HCFC) such as $CF_3CF_2CHCl_2$, a ketone such as acetone, an alcohol such as methanol or ethanol, or a mercaptan such as methylmercaptan. The amount added varies depending upon chain transfer constant of the compound used. However, it is usually from about 0.01 wt % to about 50 wt % to the polymerization medium.

EXAMPLE 1

A stainless container for reaction having an internal volume of 1.2 l was deaerated, and 1312 g of $(CF_3)_2CFOCH_3$, 13.5 g of 1,1-dichloro-2,2,3,3,3-pentafluoropropane as a chain transfer agent, 1.8 g of (perfluorobutyl)ethylene, 85 g of tetrafluoroethylene and 5.9 g of ethylene were charged thereto. The temperature was kept at 50° C., and 5 cc of perfluorocyclohexane solution having 1 wt % of bis(perfluorobutylyl)peroxide as a polymerization initiator was charged to the mixture, to initiate the reaction.

During the reaction, a mixed gas of tetrafluoroethylene and ethylene at a molar ratio of $C_2F_4/C_2H_4=53/47$, was introduced to the system, and the reaction pressure is kept at 8.9 kg/cm². The polymerization initiator was continuously charged thereto so that the polymerization speed is almost constant, and the total of 12 cc was charged. 3 hours later, 75 g of white copolymer as a slurry was obtained. The copolymer had a Q value of 5.6 at 297° C. as an index of molecular weight, a melting point of 272° C. and a thermal decomposition initial point of 348° C., and provided a good compression-molded product at a molding temperature of 300° C. The molded product had a tensile strength of 445 kg/cm² and a tensile elongation of 440%.

The Q value was the amount extruded (mm³/sec.), obtained by using koka-shiki flow tester (produced by Shimazu Machine Works), by extruding the melting copolymer from a nozzle having a diameter of 2.1 mm and a length of 8 mm at a load of 7 kg at a predetermined temperature.

EXAMPLE 2

A stainless container for reaction having an internal volume of 1.2 l was deaerated, and 1410 g of $F(CF_2)_4OCH_3$, 32 g of perfluoro(propyl vinyl ether), 13.5 g of 1,1-dichloro- 2,2,3,3,3-pentafluoropropane and 80 g of tetrafluoroethylene were charged thereto. The temperature was kept at 50° C., and 3 cc of 1 wt % perfluorocyclohexane solution having 1 wt % of bis (perfluorobutylyl)peroxide as a polymerization initiator was charged to the mixture, to initiate the reaction.

During the reaction, tetrafluoroethylene was introduced to the system, and the reaction pressure was kept at 5.1 kg/cm². The polymerization initiator was continuously charged thereto so that the polymerization speed is almost constant, and the total of 7 cc was charged. 2.6 hours after, 80 g of a white copolymer as a slurry was obtained. The copolymer had a Q value of 1.5 at 380° C., a melting point of 305° C. and a thermal decomposition initial point of 465° C., and provided a good compression-molded product at a molding temperature of 340° C. The molded product had a tensile strength of 415 kg/cm² and a tensile elongation of 320%.

EXAMPLE 3

The same operation as in Example 2 was conducted except that 400 g of hexafluoropropylene was charged instead of 32 g of perfluoro(propyl vinyl ether), and the amount of $F(CF_2)_4OC_2H_5$ charged was 1410 g instead of 1000 g, to conduct polymerization. 3.5 hours later, 45 g of a white copolymer as a slurry was obtained. The copolymer had a Q value of 8.4 at 380° C., a melting point of 278° C. and a thermal decomposition initial point of 445° C., and provided a good compression-molded product at a molding temperature of 340° C. The molded product had a tensile strength of 355 kg/cm² and a tensile elongation of 350%.

EXAMPLE 4

Comparative Example 500 g of deoxidated water, 200 g of t-butanol and 0.65 g of disuccinic acid peroxide were charged to a stainless container for reaction having an internal volume of 1.2 l. The temperature was kept at 65° C. to conduct the reaction. During the reaction, a mixed gas of tetrafluoroethylene and ethylene at a molar ratio of $C_2F_4/C_2H_4=53/47$, was introduced to the system, and the reaction pressure was kept at 9 kg/cm². 4 hours later, 24.6 g of a white copolymer was obtained. The copolymer had a Q value of 260 at 297° C., a melting point of 269° C. and a thermal decomposition initial point of 361° C. The molded product compressed at 300° C. had a small molecular weight and was fragile.

EXAMPLE 5

Reference Example

The same operation as in Example 1 was conducted except that 1255 g of 1.1.2-trichlorotrifluoroethane was charged instead of $(CF_3)_2CFOCH_3$, to conduct polymerization. 2 and half hours later, 48 g of a white copolymer as a slurry was obtained. The copolymer had a Q value of 4.5 at 297° C., a melting point of 274° C. and a thermal decomposition initial point of 352° C., and provided a good compression-molded product at a molding temperature of 300° C. The molded product had a tensile strength of 431 kg/cm² and a tensile elongation of 450%.

INDUSTRIAL APPLICABILITY

A desired fluorine-containing polymer can be produced, with very small ozone destruction effect and with efficiency equal to or higher than the conventional case wherein CFC was used.

What is claimed is:

1. A method for producing a fluorine-containing polymer, comprising:
    polymerizing at least one fluorine-containing monomer in a polymerization medium;
    wherein said polymerization medium is a compound of Formula (I):

wherein R is a $C_{2-6}$ perfluoroalkyl group, and R' is a $C_{1-2}$ alkyl group; and
    wherein said fluorine-containing monomer is selected from the group consisting of perfluoro(butenyl vinyl ether), perfluoro (allyl vinyl ether) and perfluoro (bisvinyloxymethane).

2. The method according to claim 1, wherein said polymerization medium is $F(CF_2)_4OCH_3$, $F(CF_2)_4OC_2H_5$, $(CF_3)_2CFOCH_3$ or $F(CF_2)_3OCH_3$.

3. The method according to claim 1, wherein said polymerizing of said fluorine-containing monomer occurs in the presence of a copolymerizable monomer selected from the group consisting of perfluoroethylene and perfluoropropylene.

4. The method according to claim 1, wherein said polymerization medium is an aqueous mixture.

5. The method according to claim 1, wherein the amount of said polymerization medium is from 3 to 100 times the total weight of said monomer.

6. The method according to claim 1, wherein the amount of said polymerization medium is from 5 to 50 times the total weight of said monomer.

7. The method according to claim 1, wherein said polymerizing occurs in a solution or in a suspension.

8. The method according to claim 1, wherein said polymerizing occurs in the presence of a polymerization initiator.

9. The method according to claim 8, wherein said polymerization initiator is selected from the group consisting of an organic peroxide and an azo compound.

10. The method according to claim 9, wherein said organic peroxide is selected from the group consisting of a bis(chlorofluoroacyl)peroxide, a bis(perfluoroacyl)peroxide, a bis(ω-hydroperfluoroacyl)peroxide, a t-butylperoxyisobutylate and a diisopropylperoxydicarbonate.

11. The method according to claim 9, wherein said azo compound is azobisisobutyronitrile.

12. The method according to claim 8, wherein the amount of said polymerization initiator is 0.005 to 5 wt. % based on the total weight of said monomer.

13. The method according to claim 1, further comprising adding of a compound having a chain transfer property.

14. The method according to claim 13, wherein said compound having a chain transfer property is selected from the group consisting of a hydrocarbon, a hydrofluorocarbon, a hydrochlorofluorocarbon, a ketone, an alcohol and a mercaptane.

15. The method according to claim 13, wherein the amount of said compound having chain transfer property is 0.01 wt. % to 50 wt. % based on the total weight of said polymerization medium.

16. The method according to claim 1, wherein said polymerizing occurs at a temperature of from 0 to 100° C.

17. The method according to claim 1, wherein said polymerizing occurs at a pressure of from about 2 to about 100 kg/cm².

18. A method for producing a fluorine-containing polymer, comprising:

polymerizing at least one fluorine-containing monomer in a polymerization medium;

wherein said polymerization medium is a compound of Formula (I):

R—O—R'   (I)

wherein R is a $C_{2-6}$ perfluoroalkyl group, and R' is a $C_{1-2}$ alkyl group; and wherein said fluorine-containing monomer has an alicyclic structure and is selected from the group consisting of 2,2,4-trifluoro-5-trifluoromethoxy-1,3-dioxole and perfluoro(2-methylene-4-methyl-1,3-dioxolan).

19. The method according to claim 18, wherein s aid polymerization medium is $F(CF_2)_4OCH_3$, $F(CF_2)_4OC_2H_5$, $(CF_3)_2CFOCH_3$ or $F(CF_2)_3OCH_3$.

20. The method according to claim 18, wherein said polymerizing of said fluorine-containing monomer occurs in the presence of a copolymerizable monomer selected from the group consisting of perfluoroethylene and perfluoropropylene.

21. The method according to claim 18, wherein said polymerization medium is an aqueous mixture.

22. The method according to claim 18, wherein the amount of said polymerization medium is from 3 to 100 times the total weight of said monomer.

23. The method according to claim 18, wherein the amount of said polymerization medium is from 5 to 50 times the total weight of said monomer.

24. The method according to claim 18, wherein said polymerizing occurs in a solution or in a suspension.

25. The method according to claim 18, wherein said polymerizing occurs in the presence of a polymerization initiator.

26. The method according to claim 25, wherein said polymerization initiator is selected from the group consisting of an organic peroxide and an azo compound.

27. The method according to claim 26, wherein said organic peroxide is selected from the group consisting of a bis(chlorofluoroacyl)peroxide, a bis(perfluoroacyl)peroxide, a bis(ωhydroperfluoroacyl)peroxide, a t-butylperoxyisobutylate and a diisopropylperoxydicarbonate.

28. The method according to claim 26, wherein said azo compound is azobisisobutyronitrile.

29. The method according to claim 25, wherein the amount of said polymerization initiator is 0.005 to 5 wt. % based on the total weight of said monomer.

30. The method according to claim 18, further comprising adding of a compound having a chain transfer property.

31. The method according to claim 30, wherein said compound having a chain transfer property is selected from the group consisting of a hydrocarbon, a hydrofluorocarbon, a hydrochlorofluorocarbon, a ketone, an alcohol and a mercaptane.

32. The method according to claim 30, wherein the amount of said compound having a chain transfer property is 0.01 wt. % to 50 wt. % based on the total weight of said polymerization medium.

33. The method according to claim 30, wherein said polymerizing occurs at a temperature of from 0 to 100° C.

34. The method according to claim 30, wherein said polymerizing occurs at a pressure from about 2 to about 100 $kg/cm^2$.

* * * * *